United States Patent [19]
Repetto

[11] 3,736,776
[45] June 5, 1973

[54] SKIN SPLITTING MACHINE
[75] Inventor: Silvio Repetto, Modena, Italy
[73] Assignee: S.p.A. Luigi Rizzi & Co., Modena, Italy
[22] Filed: Apr. 12, 1971
[21] Appl. No.: 133,034

[30] Foreign Application Priority Data
Apr. 14, 1970 Italy................................23281 A/70

[52] U.S. Cl.......................................69/13, 29/125
[51] Int. Cl. ................................................C14b 1/14
[58] Field of Search ..............................69/10; 29/125

[56] References Cited
UNITED STATES PATENTS

| 596,440 | 12/1897 | Barton | 69/10 |
| 615,646 | 12/1898 | Whipple | 69/10 |
| 1,010,752 | 12/1911 | Haines | 69/10 |
| 1,183,758 | 5/1916 | O'Brien | 69/10 |
| 1,382,755 | 6/1921 | Baxter | 69/10 |
| 1,594,875 | 8/1926 | Brenner | 29/125 X |
| 2,446,211 | 8/1948 | Clark | 29/125 X |
| 2,524,013 | 9/1950 | Hall | 69/10 |

Primary Examiner—Alfred R. Guest
Attorney—Kurt Kelman

[57] ABSTRACT

A skin splitting machine having a knife, and a conveyor for carrying the skin to the knife and means for pressing the skin to the conveyor. The pressing means comprises a series of axially aligned resilient discs and a non-resilient roller interposed between each disc and the conveyor. Each disc and roller cooperating independently to press the skin to the conveyor.

8 Claims, 3 Drawing Figures

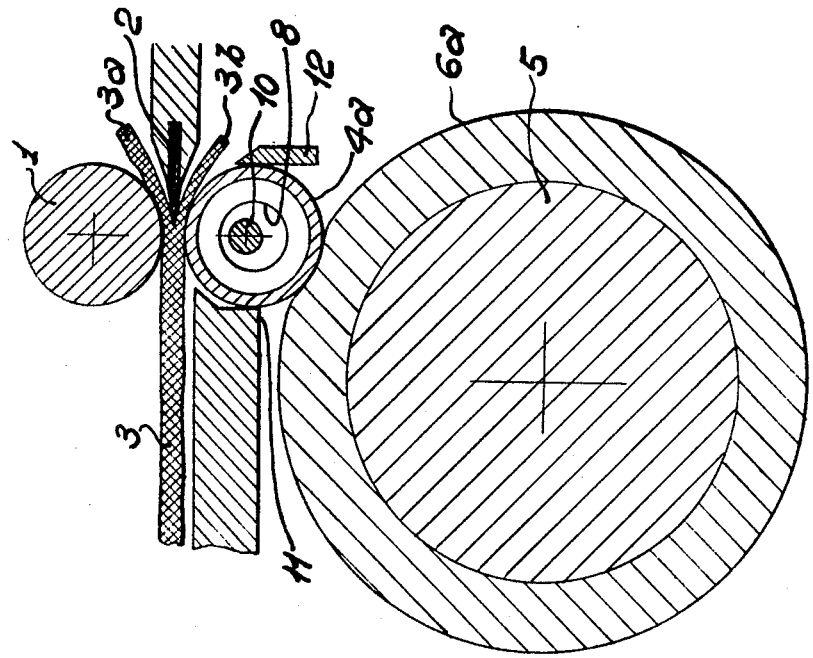
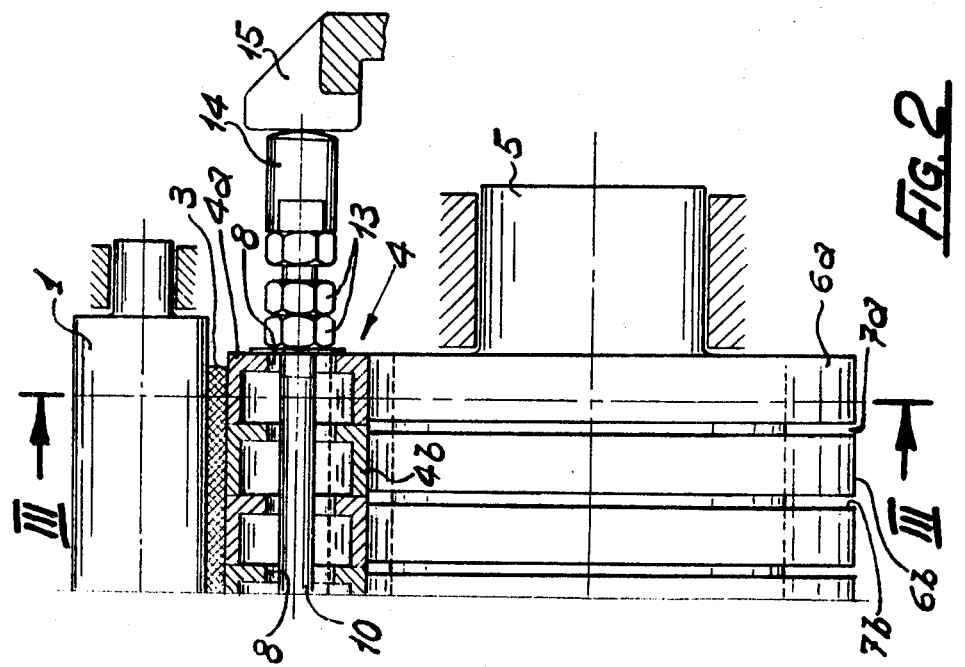

SKIN SPLITTING MACHINE

The present invention concerns a skin splitting machine having a resilient-faced roller comprising an assembly of separate adjacent co-axial discs, each corresponding to a ring of a skin squeezing roller and in pressure contact therewith.

In skin splitting machines, one of the principal problems is the necessity of obtaining an absolutely uniform surface of the skin on the hair side of the hide, even if the inside of flesh side of the skin has substantial irregularities such as protuberances, pieces of flesh, fat or the like.

In conventional splitting machines attempts have been made to solve the problem by supporting the flesh or inside of the skin against a convey or roller by a loose or idler roller formed of a plurality of rings of rigid material, each free to displace itself radially relative to the axis of the roller, to a degree corresponding to the surface irregularity of the flesh side of the skin.

In such conventional machines, the rings of the loose roller are supported against a rubber-covered counter roller which provides a certain elastic pressure on the rings pressing the skin against the conveyor roller. Other known types of skin splitting machines have, instead of the loose roller, a series of detached and aligned rollers, each mounted on a displaceable fork urged by a spring or similar thrust means towards the conveyor roller.

Both systems have appreciable disadvantages. In the first case, the rubber covered counter-roller, in contact with each ring, exerts heavy pressure where the thickness of the skin is locally greater, whilst in the adjacent area where the skin may be thinner, it exerts a much lower pressure. In such cases, adjacent rubber portions feel the effect of deformation produced by the pressure of a roller ring corresponding with the locally greater thickness of the skin and the skin is not held with a uniform pressure against the convey or roller. This produces a non-uniform thickness in the split skin. In the second system, the aligned and adjacent spring loaded rollers cannot be in close contact with each other on account of the space taken up by the roller supports and the elastic thrust means; therefore the pressure of said rollers against the skin is not continuous, with spaces between adjacent rollers not under any pressure at all and so strips of cut skin of irregular thickness are produced.

The machine of the present invention eliminates these disadvantages.

According to the present invention, a skin splitting machine having a knife, and convey or similar means for carrying the skin to the knife, is provided with means for pressing the skin uniformly against the conveyor. The means comprise a series of axially aligned discs, each having a resilient peripheral surface, and a roller disposed between each disc and the skin surface. The discs and roller act independently to apply pressure to the skin.

The rubber covered roller may be formed as a row of discs of hard material having a peripheral thickness or covering of rubber. Each disc has an axial width equal to or less than that of each ring of the loose roller for the whole thickness of the rubber. Preferably, the rubber covered roller according to the invention is composed of a single piece shaft having a cylindrical covering or rubber, said covering being grooved to form discs separated by restricted recesses extending towards the shaft of the roller, the spacing of the discs being that of the rings of the loose roller. The rubber covered roller of the present invention makes it possible to exert the necessary pressure by way of the rings of the loose roller against the flesh side of the skin to be cut, each disc being pressed upon by its own corresponding ring in proportion to the thickness which the ring finds on the flesh side of the skin. The adjacent rings are not influenced by the deformation caused by the ring concerned, and the pressure of the skin against the conveyor roller will be substantially constant with consequent uniformity of cutting thickness.

Reference is now made to the accompanying drawing, in which:

FIG. 2 is an end view of the rollers, to an enlarged scale, and

FIG. 3 is a section on the line III—III of FIG. 2.

FIG. 1 shows a conveyor roller 1 and a cutting blade 2 of a splitting machine, viewed from the front, at the cutting area.

Figure 1:
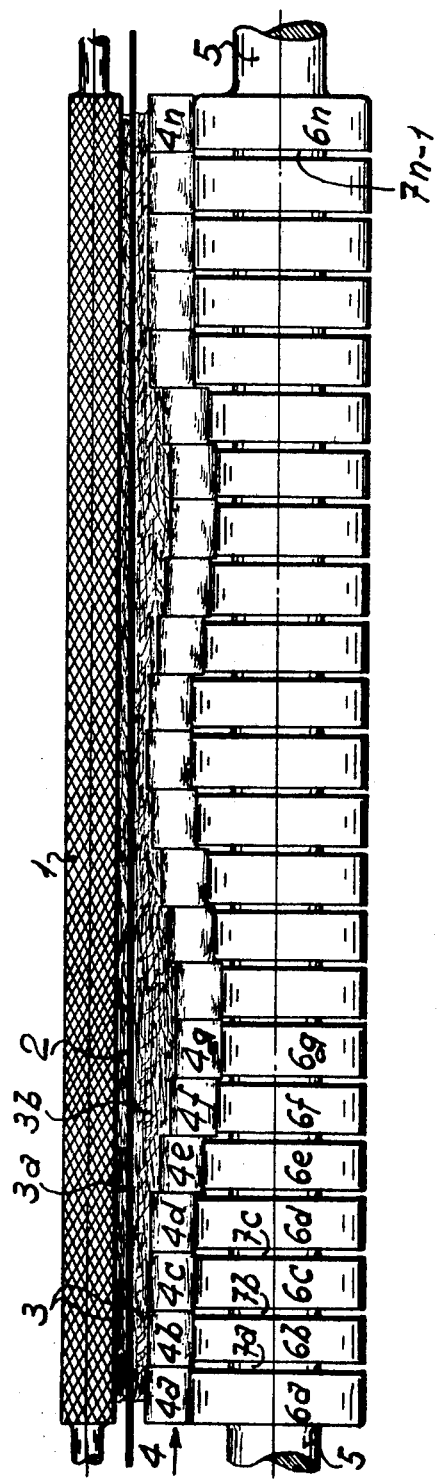
FIG. 1 is a front view of the machine according to the invention.

A skin 3 to be split is pressed against the conveyor roller 1 by a loosely mounted squeeze roller 4, whilst the cutting blade 2 is disposed, relatively to the first, at the desired distance for obtaining a certain thickness $3a$ of the skin on the hair side. The loose roller 4 is formed by a series of rings $4a$, $4b$, $4c$ ... $4n$, each formed of steel adjacent to each other having an enlarged bore 8 and mounted on a shaft 10 so as to be individually free to move in a radial direction in a manner to be described later. A rubber covered roller is composed of a continuous central shaft 5 on which there is a formed a row of discs of resilient material $6a$, $6b$, $6c$ ... $6n$, corresponding respectively, to the rings $4a$, $4b$, $4c$ ... $4n$, each such disc being of a width equal to or less than the corresponding ring and being spaced from the adjacent ring by an annular recess $7a$, $7b$, $7c$ ... $7n$ -1.

The rubber covered roller may consist of a single shaft 5 on which there is secured a continuous resilient cylinder provided with the recesses $7a$, $7b$, $7c$ ... $7n$ -1 so as to form the resilient discs, or it may be formed as a series of independent rubber covered discs with a suitable core, each mounted on a single shaft and uniformly spaced from each other to provide the recesses $7a$, $7b$, $7c$ ... $7n$ -1. Thus, in the first embodiment noted, the roller shaft 5 may have secured thereon a resilient cylindrical body having a plurality of axially aligned transverse grooves to form the discs.

As may be seen from the figure, each variation in thickness of the skin 3 on the flesh side $3b$, (deliberately magnified for greater clarity), separately presses the rings $4e$, $4f$, $4g$ .... In the areas of greater thickness, the ring as moved away from their normal positions into the corresponding rubber covered discs $6e$, $6f$, $6g$ ... each of which is in turn deformed by an amount determined by the corresponding variation in the thickness of the skin, without any of the rings or discs being able to influence their next adjacent discs. Due to the presence of the recesses $7d$, $7e$, $7f$ ... interposed between each disc is displaced radially independently of the other. It follows that each rubber covered disc is deformed only by its own ring and reacts in proportion, without being influenced by the deformation of the adjacent discs, thus producing in the skin a substantially uniform pressure against the conveyor roller and hence a uniform thickness of cut from the hair of the split skin.

From FIGS. 2 and 3 it will be seen that the loose roller 4 is formed of a series of cup-shaped rings 4a, 4b, 4c . . . having cylindrical outer faces. The rings are mounted on a shaft 10 the diameter of which is much smaller than the diameter of the axial holes 8 in each of the rings. This permits the rings to be radially displaced towards or away from the skin allowing them to compress the rubber discs 6a, 6b, 6c . . . to a degree corresponding to the varying thickness of the skin. The rings may also revolve about the shaft 10.

Fixed guides 11 and 12 with parallel vertical surfaces restrict horizontal movement of the rings 4. The rings are held adjacent one another by means of lock nuts 13 on the end of the shaft 10.

The shaft 10 is provided with a terminal head 14 which rests against an adjustable stop 15, whereby the rings 4 may be correctly aligned axially with respect to the discs 6.

It is obvious that many variations may be applied to the above described device, in particular with regard to the adaptation of the rubber covered roller to the type of splitting machine, to its capacities and dimensions. Again it is possible for each rubber covered disc to be in contact with more than one displaceable ring without thereby departing from the scope of the following claims.

I claim:

1. A skin splitting machine which comprises in combination, a knife, a conveyor for carrying a skin to said knife, and means for pressing said skin against said conveyor, said means consisting of a roller comprising a plurality of axially aligned discs each disposed on an axle and having a resilient peripheral surface spaced from said conveyor, and a second roller comprising a plurality of cup-shaped roller elements mounted along an axle with each cup-shaped roller element disposed between each disc and the skin being split, said cup-shaped roller elements disposed normally free of axial contact with free movement in both a vertical direction and a tilt direction relative its axial direction, said cup-shaped roller elements disposed for maintaining a uniform resilient pressure on the under portion of the skin being split.

2. The machine, according to claim 1, wherein said discs have their centers aligned along a common axis.

3. The machine, according to claim 1, wherein said roller elements are separate and independent of each other and have an axial width equal to the axial width of the associated disc.

4. The machine, according to claim 1, wherein said discs are formed from an integral body of resilient material separated by uniform axial spaced annular recesses therein.

5. The machine, according to claim 1, wherein said discs each comprise a resilient ring secured about a central shaft and uniformly spaced one from the other.

6. The machine according to claim 1, wherein each of said roller elements comprising a non-resilient ring, mounted on a fixed shaft, said rings having a central opening the diameter of which is greater than the diameter of said shaft whereby said non-resilient rings may be caused to move radially of said shaft.

7. The machine according to claim 1, wherein the resilient peripheral surface is made of rubber.

8. The machine, according to claim 1, wherein the plurality of axially aligned discs are disposed as a resilient cylindrical body secured over a central shaft, said discs formed by a plurality of axially aligned transverse grooves.

* * * * *